US012808805B2

(12) United States Patent
Majumdar et al.

(10) Patent No.: US 12,808,805 B2
(45) Date of Patent: Nov. 24, 2026

(54) SYSTEM FOR EARLY DETECTION OF PLANT DISEASE

(71) Applicant: RENSSELAER POLYTECHNIC INSTITUTE, Troy, NY (US)

(72) Inventors: Zigurts Krishna Majumdar, Troy, NY (US); Jaimin Patel, Jefferson City, MO (US); Andrew Bierman, Albany, NY (US); Mark S. Rea, Melrose, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 1039 days.

(21) Appl. No.: 17/426,143

(22) PCT Filed: Jan. 28, 2020

(86) PCT No.: PCT/US2020/105305
§ 371 (c)(1),
(2) Date: Jul. 28, 2021

(87) PCT Pub. No.: WO2020/159913
PCT Pub. Date: Aug. 6, 2020

(65) Prior Publication Data

US 2022/0099578 A1 Mar. 31, 2022

Related U.S. Application Data

(60) Provisional application No. 62/966,262, filed on Jan. 27, 2020, provisional application No. 62/798,141, filed on Jan. 29, 2019.

(51) Int. Cl.
*G01N 21/64* (2006.01)
*G01J 3/02* (2006.01)
(Continued)

(52) U.S. Cl.
CPC ........ *G01N 21/6486* (2013.01); *G01J 3/0256* (2013.01); *G01J 3/0275* (2013.01);
(Continued)

(58) Field of Classification Search
None
See application file for complete search history.

(56) References Cited

U.S. PATENT DOCUMENTS

| | | |
|---|---|---|
| 6,052,187 A | 4/2000 | Krishnan |
| 7,412,330 B2 | 8/2008 | Spicer |

(Continued)

FOREIGN PATENT DOCUMENTS

| | | |
|---|---|---|
| CA | 3048320 | * 12/2017 |
| CA | 3048320 A1 | 7/2018 |

(Continued)

OTHER PUBLICATIONS

International Search Report and The Written Opinion of the International Searching Authority, International Application No. PCT/US2020/015305, mailed Apr. 21, 2020.

(Continued)

*Primary Examiner* — Hoon K Song
(74) *Attorney, Agent, or Firm* — Barclay Damon LLP; Anthony P. Gangemi

(57) ABSTRACT

An apparatus for detecting a plant health status is described. The apparatus includes a light source positioned relative to the plant and a detector positioned relative to the plant. The light source is configured to emit a white light or an ultraviolet light. The ultraviolet (UV) light corresponds to UV-A and has a wavelength in the range of 340 nanometers (run) to 400 nm. The detector is configured to receive evaluation light. The evaluation light is related to the emitted light and corresponds to a health status of the plant.

14 Claims, 2 Drawing Sheets

(51) Int. Cl.
*G01J 3/10* (2006.01)
*G01J 3/44* (2006.01)
*G01N 21/84* (2006.01)

(52) U.S. Cl.
CPC ............... *G01J 3/10* (2013.01); *G01J 3/4406* (2013.01); *G01N 2021/8466* (2013.01); *G01N 2201/0221* (2013.01); *G01N 2201/062* (2013.01)

(56) References Cited

U.S. PATENT DOCUMENTS

| | | | | |
|---|---|---|---|---|
| 7,715,013 | B2 | 5/2010 | Glaser | |
| 8,391,550 | B2 | 3/2013 | Pachys | |
| 9,113,590 | B2 | 8/2015 | Johnson | |
| 9,128,049 | B2 | 9/2015 | Groz | |
| 9,804,097 | B1 | 10/2017 | Tang | |
| 9,921,162 | B2 | 3/2018 | Tischler | |
| 2003/0104390 | A1 | 6/2003 | Etienne | |
| 2018/0085003 | A1* | 3/2018 | Goldring | A61B 5/746 |
| 2018/0284016 | A1 | 10/2018 | Fujiyama | |
| 2018/0324407 | A1* | 11/2018 | Peeters | H04N 13/243 |
| 2020/0063931 | A1* | 2/2020 | Song | F21S 10/023 |
| 2021/0259158 | A1* | 8/2021 | Ashdown | A01G 9/249 |

FOREIGN PATENT DOCUMENTS

| | | | |
|---|---|---|---|
| CN | 107087519 | * | 5/2017 |
| CN | 107087519 | A | 8/2017 |
| CN | 107609078 | A | 1/2018 |

OTHER PUBLICATIONS

Zoran G. Cerovic et al., "Ultraviolet-induced fluorescence for plant monitoring: present state and prospects." Agronomie, EDP Sciences, 1999, 19 (7), pp. 543-578.

Daniel J. Maxwell et al., "The Effects of Plant Virus Infection on Polarization Reflection from Leaves." PLoS ONE 11(4): e0152836. doi: 10.1371/ journal.pone.0152836.

Lloyd Donaldson et al., "Imaging and Spectroscopy of Natural Fluorophores in Pine Needles" ; Plants 2018, 7, 10; doi:10.3390/ plants7010010; Published: Feb. 17, 2018.

* cited by examiner

SYSTEM FOR EARLY DETECTION OF PLANT DISEASE

CROSS REFERENCE TO RELATED APPLICATION(S)

This application claims the benefit of U.S. Provisional Application No. 62/798,141, filed Jan. 29, 2019, and U.S. Provisional Application No. 62/966,262, filed Jan. 27, 2020, and which are incorporated by reference as if disclosed herein in their entireties.

FIELD

The present disclosure relates to detection of plant disease, and in particular, to a system for early detection of plant disease.

BACKGROUND

Early detection of crop diseases is challenging. Generally, diagnosis is performed by a trained plant pathologist and/or a molecular assay, which can be time-consuming and expensive. Determining the appropriate and most effective time for applying fungicides, pesticides, or other products that are intended to protect or help crop growth rely on crop disease detection. Early and accurate crop disease (and/or crop stress) detection may make the application of such products more efficient from both a cost perspective and a time perspective. Such disease detection and application of such products may be especially important in geographic areas in which farmers may have limited resources available for crop management.

SUMMARY

In some embodiments, an apparatus for detecting a plant health status is provided. The apparatus includes a light source positioned relative to the plant and a detector positioned relative to the plant. The light source is configured to emit a white light or an ultraviolet light. The ultraviolet (UV) light corresponds to UV-A and has a wavelength in the range of 340 nanometers (nm) to 400 nm. The detector is configured to receive evaluation light. The evaluation light is related to the emitted light and corresponds to a health status of the plant.

In some embodiments, the apparatus further includes a light source polarizer positioned between the light source and the plant. The light source is configured to emit the white light and the light source polarizer is configured to filter the emitted white light.

In some embodiments, the apparatus further includes a detector polarizer positioned between the detector and the plant. The light source is configured to emit the white light. The detector polarizer is configured to filter an intermediate light and the evaluation light corresponds to the filtered intermediate light.

In some embodiments, the apparatus further includes a location sensor configured to sense a location of the plant. The location sensor is coupled to at least one of the light source or the detector. In some embodiments of the apparatus, the light source is selected from the group comprising a flashlight and a light emitting diode (LED). In some embodiments of the apparatus, the detector is a camera included in a handheld computing device. In some embodiments of the apparatus, the emitted light is the UV-A light and the evaluation light corresponds to fluorescence emitted by the plant.

In some embodiments, a system for detecting a plant health status is provided. The system includes a light source positioned relative to the plant, a detector positioned relative to the plant, and a plant status module. The light source is configured to emit a white light or an ultraviolet light. The ultraviolet (UV) light corresponds to UV-A and has a wavelength in the range of 340 nanometers (nm) to 400 nm. The detector is configured to receive evaluation is light. The evaluation light is related to the emitted light and corresponds to a health status of the plant. The plant status module is configured to determine the plant health status based, at least in part, on the received evaluation light.

In some embodiments, the system further includes a plant status data store configured to store a plurality of plant status records. Each record includes a location identifier, a plant status indicator for at least one plant at or near the location and a timestamp.

In some embodiments of the system, the plant status module is further configured to monitor a trend in plant status associated with a selected location and based, at least in part, on a time duration between a pair of plant statuses, sequential in time.

In some embodiments, the system further includes a light source polarizer positioned between the light source and the plant and a detector polarizer positioned between the detector and the plant. The light source is configured to emit the white light. The light source polarizer is configured to filter the emitted white light. The detector polarizer is configured to filter an intermediate light and the evaluation light corresponds to the filtered intermediate light.

In some embodiments, the system further includes a location sensor configured to sense a location of the plant. The location sensor is coupled to at least one of the light source or the detector. In some embodiments of the system, the light source is selected from the group comprising a flashlight and a light emitting diode (LED). In some embodiments of the system, the detector is a camera included in a handheld computing device.

In some embodiments, a method for detecting a plant health status is provided. The method includes emitting, by a light source positioned relative to the plant, a white light or an ultraviolet light. The ultraviolet (UV) light corresponds to UV-A and has a wavelength in the range of 340 nanometers (nm) to 400 nm. The method further includes receiving, by a detector positioned relative to the plant, evaluation light. The evaluation light is related to the emitted light and corresponds to a health status of the plant. The method further includes determining, by a plant status module, the plant health status based, at least in part, on the received evaluation light.

In some embodiments, the method further includes storing, by a plant status data store, a plurality of plant status records. Each record includes a location identifier, a plant status indicator for at least one plant at or near the location and a timestamp.

In some embodiments, the method further includes monitoring, by the plant status module, a trend in plant status associated with a selected location and based, at least in part, on a time duration between a pair of plant statuses, sequential in time.

In some embodiments of the method, the light source is configured to emit the white light and the method further includes filtering, by a light source polarizer positioned between the light source and the plant, the emitted white light and filtering, by a detector polarizer positioned between the detector and the plant, an intermediate light. The evaluation light corresponds to the filtered intermediate light.

In some embodiments, the method further includes sensing, by a location sensor, a location of the plant. The location sensor is coupled to at least one of the light source or the detector.

In some embodiments, there is provided a computer readable storage device. The device has stored thereon instructions that when executed by one or more processors result in the following operations including any embodiment of the method.

BRIEF DESCRIPTION OF THE DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

DETAILED DESCRIPTION

Figure 1:
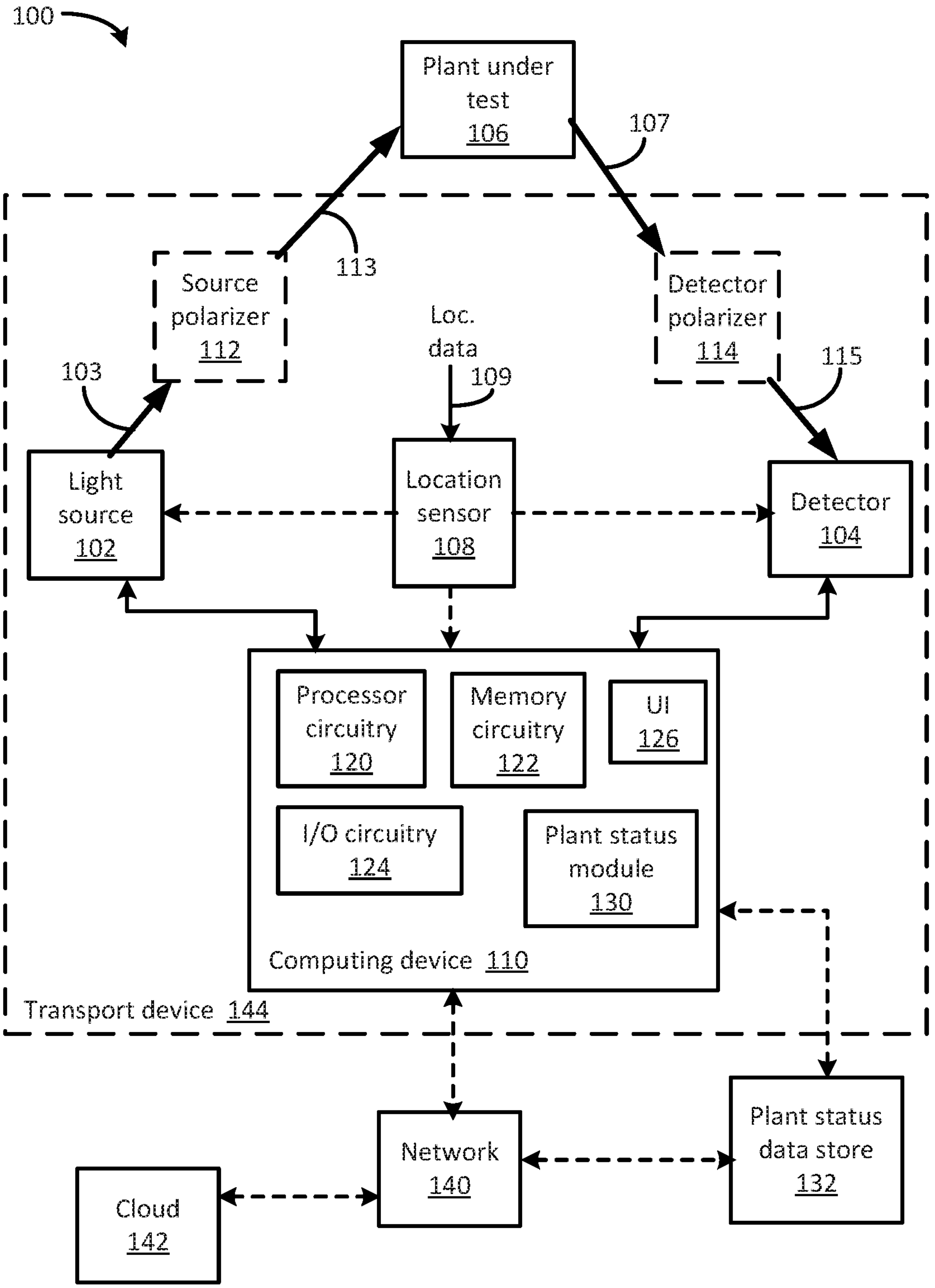
FIG. 1 illustrates a functional block diagram of a system for early detection of plant disease consistent with several embodiments of the present disclosure.

Generally, an apparatus, method and/or system for early detection of plant disease (including plant stress) is configured to illuminate a plant under test by a light source and to detect by a detector a corresponding evaluation light from the plant under test. The evaluation light may include reflected, transmitted or emitted (e.g., fluorescent) light. In an embodiment, the light source may be configured to emit white light and the evaluation light may be polarized. In one nonlimiting example, the light source may be a flashlight and the detector may correspond to an image sensor (e.g., included in a camera). In this embodiment, the system may further include a source polarizer configured to filter the emitted white light and/or a detector polarizer configured to filter the reflected or transmitted light. The filtering by the polarizer(s) is configured to enhance disease-specific contrast for detection by a detector In another embodiment, the light source may be configured to emit ultraviolet (e.g., UV-A) light having a wavelength in the range of 340 nanometers (nm) to 400 nm. In one nonlimiting example, the light source may be a light-emitting diode (LED). A plant under test exposed to the UV-A light may then fluoresce. In other words, the plant under test that receives the UV-A light emitted by the light source may then fluoresce and emit light in a visible range, i.e., wavelengths in the 400 to 700 nm range. The resulting fluorescence may facilitate disease detection by enhancing a color difference between regions of a leaf of a plant that is stressed and/or diseased.

It may be appreciated that necrotic plant tissue has a very bright blue green fluorescence and is visible in even brighter ambient white light (vs. chlorophyll, for example). This can help detect necrosis in areas that might be difficult to easily resolve otherwise, such as deeper in canopies where the contrast from background is low with ambient or reflected light.

Early detection of plant stress and/or disease may facilitate early intervention thus preventing spread and/or reducing severity of a detected disease. Additionally or alternatively, monitoring plant status over time and mapping location of stressed and/or diseased plants may facilitate early identification of a trend that may then support early intervention.

A variety of agricultural imaging technologies may be utilized to characterize crop canopy leaves. Such characterizing may be configured to, for example, find rare phenotypes. In another example, such characterizing may be used to guide interventions, since leaf spectral properties can be early indicators of biotic and abiotic stress. In one nonlimiting example, imaging spectral reflectance properties (e.g., color images with three spectral bands, red, green and blue (RGB)) of plant leaves may be used in remote sensing of agricultural crops, plant phenotyping, breeding, and in controlled indoor agriculture. A number of pests affect leaves of crops directly including, but not limited to, fungal, bacterial and viral pathogens. Abiotic stresses, such as lack of nutrients and water may be inferred. Visually differentiating between normal and stressed plant tissue facilitates detection of plant stress and/or disease. For example, in multi-spectral and hyperspectral imaging, specific spectral bands may be selected and contrasted as a function of wavelength, thus providing a contrast that may be used by detection techniques. Such techniques may be affected by variation in illumination spectrum, angle and the bi-directional reflectance distribution function (BRDF) of different leaves. Such variability may then affect the reliability of the measurement and its interpretation.

Disease detection instruments that use spectral reflectance may set thresholds for detection based on “vegetation indices” (VIs). VIs are ratios of the detected signal in different parts of the spectrum, so as to remove variations in the absolute irradiance that can be influenced by a number of factors. Whether the VI is defined a priori or a posteriori, a ratio is typically used. In hyperspectral imaging, the spectral dimension may be decomposed into basis functions whose coefficients represent relative amounts of a target feature. Regardless of the measurement or analysis technique used, variation in a target feature can affect sensitivity and specificity of detection. Reflectance measurements may be affected by variable spectrum of illumination (e.g., sky conditions) and angle dependent scattering, which varies according to leaf surface texture and angles relative to illumination and observation.

In an embodiment, an apparatus, system and/or method may be configured to use polarization (e.g., filtering by polarizer(s)) to improve disease-specific contrast for detection by a detector including, but not limited to, a human eye, an image sensor (e.g., camera), etc. Polarization may reduce variability in spectrally derived vegetation indices.

Linear polarizers are used to select one projection of the polarization state of light whose direction of propagation is parallel to the surface normal of the polarizer. When two ideal polarizers are in series with polarization angles at 90 degrees relative to one another (“orthogonal”, or “crossed”), no light will pass through. Similarly, if polarizers are placed adjacent to one another and a light source passes through one and is reflected from an object in front such that the object preserves the initial state of polarization (such as a mirror), no light passes to the observer. However, if the object is a diffusely scattering medium, so that some fraction of the light has a 90 degree rotation, that fraction may be observed through the crossed polarizer. Diffuse scattering is common in biological tissues and can be due to densely packed structures that are of a size near and less than the wavelength of light, causing photon trajectories to become randomized and undergo multiple scattering events, resulting in depolarization (equal polarization probabilities at any angle of observation). As is known, a number of objects may have both a specular component and a diffuse component, which depends on the surface structure, the sub-surface structure and the relative angles between illumination and observation.

Plant leaves vary in how shiny they are. When the leaf contains a pathogen, the pathogen can modify the surface structure of the leaf and may thus alter the angularly dependent scattering of incident light. The fraction of light whose trajectory is altered is related to the magnitude of the disturbance (for example, an amount of the pathogen. For example, late stages of powdery mildew may be clearly visible, but early stages may not be detected, because the percent change in signal is small. Polarization can be used to select the fraction of scattered light in which the presence or absence of the alteration causes a larger percent change. For example, if a surface pathogen such as powdery mildew causes a differing degree of depolarization relative to the bare leaf surface, the polarization technique may enhance the contrast. Other types of pathogens, or sources of stress, may alter the chromophore content of the leaf, such as loss of chlorophyll (chlorosis). In these cases, such as early downy mildew (DM) infection, enhancing the ability to resolve subtle changes in leaf pigmentation can improve the ability to detect stress and disease. In cases of early chlorosis, glare from the leaf can reduce the ability to detect subtle changes occurring below the surface. Pathogens such as DM reside on the bottom leaf surface making early detection more challenging when the majority of the evaluation light contains a smaller percentage of photons backscattered from deeper leaf layers.

In the embodiment that utilizes polarization, the polarized reflectance (i.e., polarized scattering mode) is based on the principle that light reflected from a surface is generally preferentially polarized. For example, polarized sunglasses may reduce glare by way of reducing polarized reflection from surfaces. The surface of many leaves is shiny and even when not shiny, surface reflected light often has a strong preferential polarization. The diffuse scattering inside of the leaf body (below the epidermal layer) may cause a portion of the incident light to become depolarized due to multiple scattering events, therefore, it is possible to separate surface reflection from diffuse scattering using polarization. The diffuse scattering component is generally a more accurate representation of the absorption characteristics of the chlorophyll and pigments within the body of the leaf, because it represents light that directly interacts with these pigments. The diffuse scattering component may enhance the ability to detect early chlorosis (e.g., spot yellowing on green leaves). In a number of leaves, a straight beam of light may penetrate relatively deeper into the layers of the leaf (between upper and lower epidermis). Thus, applying a directed beam that is polarized (by a source polarizer) to a plant under test, together with a detector configured to receive evaluation light that has a polarization orthogonal to the incident beam, may facilitate detection of subtle spot chlorosis and therefore detect plant disease at an earlier stage. In an embodiment, a detector polarizer may be included in rotatable polarized eye-glasses that can be rotated to enhance visual contrast for spot chlorosis detection in ambient sunlight, or other light under a variety of relative orientations. A detector polarizer that is rotatable is is configured to provide flexibility to accommodate a plurality of viewing angles relative to incident ambient light, leaf orientation, etc.

Turning now to the embodiment based on the fluorescence of plants in response to incident ultraviolet light, a light source, consistent with the present disclosure, may be configured to emit ultraviolet light with a wavelength in the range of 340 nm to 390 nm (i.e., UV-A). It may be appreciated that this is a region of the spectrum that is not visible to the human eye. A very small percentage (negligible for practical purposes) of light in this range of wavelengths reaches the retina due to corneal and lens absorption and other parts of the ocular media. Similarly, color cameras are typically not sensitive to this range of wavelengths, in part due to the low transmission of the optics and the spectral sensitivity of the focal plane array (similar to the human eye). Thus, fluorescence excited by ultraviolet light may be viewed without use of an emission filter. In other words, an emission filter that blocks excitation light, but passes emitted fluorescence may be used when using visible light to excite fluorescence emission. Generally, the intensity of fluorescence emission from plant leaves (for chlorophyll, for example) may be on the order of 1% or less of the exciting light intensity. Thus, if the light being used to excite the fluorescence has enough spectral overlap in the visible range, it may be challenging to detect.

The region of the electromagnetic spectrum corresponding to wavelengths in the range of 340 nm to 390 nm may simultaneously excite the major fluorophores contained in plant leaves that include chlorophyll a, chlorophyll b, ferulic acid, FAD (flavin adenine dinucleotide) and NADPH (nicotinamide adenine dinucleotide phosphate (reduced)) and in some plants (such as grape leaves) stilbenes such as resveratrol that emit in the deeper blue. These fluorophores may give rise to far red, red, blue, green and blue and deep blue fluorescence, respectively. Variable fluorescence may occur due to different concentrations of compounds (e.g., flavonols, phenolics, anthocyanins) not only due to their fluorescence emission, but because they absorb light, causing the exciting light (and in some cases, emitted light) to be absorbed in amounts that vary according to their local concentration. Variable fluorescence may thus provide a mechanism of differential contrast between physiological states (as due to stress, metabolism, or different light exposure history). Thus, the UV-A range may be utilized for visualizing multi-spectral fluorescence properties of plant leaves.

Both the patterns of fluorescence and the ratios of fluorescence emission in the blue (~440-460 nm), green (~520-530 nm) and red (>670 nm) wavelengths may be used as early indicators of plant stress. Such plant stress may include abiotic stress (such as drought), or biotic stress, such as fungal infection. The values and patterns of these ratios may vary across plant species. A common observation is that anomalous patterns in fluorescence emission (as compared to a corresponding healthy pattern) can be used to detect early stress. In some cases, this variability is due to impaired photosynthetic efficiency (which can increase chlorophyll fluorescence), changing concentrations of ferulic acid, changes in metabolism (FAD, NADPH), or, changes in the concentration of protective compounds (such as phenolics) whose absorption spectrum is in the UV range and are often compartmented in the top layers of the leaf. Each of these physiological changes can cause the observed fluorescence to vary as a function of, for example, pathogen infection, or light exposure (particularly UV-C and UV-B). The ability to quickly evaluate spatial variation in these patterns (no matter which ratio quantities differ between diseased and normal)

may provide a user (or an autonomous vehicle, e.g., a robot) with an ability to detect anomalies relatively more easily. Such early detection may then provide an indication or a basis for additional investigation, e.g., to zero in on the problem.

Additionally or alternatively, source light in this region of the electromagnetic spectrum (340-390 nm) may provide safer operation for humans because of a higher damage threshold for UV-A radiation (as compared to UV-B and UV-C). Source light in this region may be safer for the retina, where the primary biological hazard is determined by measurement of $W/m^2$ (watt per square meter) as opposed to $W/m^2*Sr$ (watt per steradian per square meter), the latter being of importance for retinal hazards. For further precaution, a user may wear a plastic or glass spectacle that has low UV-transmittance.

Additionally or alternatively, the UV-A region (340-400 nm) may be less damaging to plant tissue as compared to UV-B and UV-C light. Typically, a 100-fold higher radiation dose of light in the UV-A range may cause equivalent to damage to a plant as compared to UV-C light, for example. In one nonlimiting example, the operating range of a system consistent with the present disclosure may be between 9-2.5 $kW/m^2$ integrated over the entire UV-A range, with exposure for a few seconds amounting to a maximum dose <10 kJ/m2 per observation time, resulting in no expected damage to plant tissue. The exposure may be reduced with a relatively a more sensitive imaging system.

Thus, an apparatus, method and/or system for early detection of plant disease (including plant stress) may be configured to illuminate a plant under test using a light source and to detect a corresponding evaluation light from the plant under test using a detector. The evaluation light may include reflected, transmitted or emitted (e.g., fluorescent) light. In an embodiment, the light source may be configured to emit white light and the detector may correspond to an image sensor (e.g., included in a camera). In this embodiment, the system may further include a source polarizer configured to filter the emitted white light and/or a detector polarizer configured to filter the reflected or transmitted light. The filtering by the polarizers is configured to enhance disease-specific contrast for detection by a detector.

In another embodiment, the light source may be configured to emit ultraviolet (e.g., UV-A) light having a wavelength in the range of 340 nm to 400 nm. A plant under test exposed to the UV-A light may then fluoresce and emit light in a visible range. The resulting fluorescence may facilitate disease detection by enhancing a color difference between regions of a leaf of a plant that is stressed and/or diseased.

FIG. 1 illustrates a functional block diagram 100 of a system for early detection of plant disease consistent with several embodiments of the present disclosure. System 100 includes a light source 102, a detector 104, a location sensor 108 and a computing device 110. The light source 102 and the detector 104 may be positioned relative to a plant under test 106 and relative to each other. The location sensor 108 may be included in or coupled to the light source 102 and/or the detector 104. In some embodiments, system 100 may include source polarizer 112 and/or detector polarizer 114. Polarizers 112 and 114 may be configured to filter incident light, as described herein.

The light source 102 is configured to emit light (i.e., emitted light 103). The emitted light 103 may be white light or an ultraviolet light. In one nonlimiting example, the light source 102 may correspond to a flashlight. The flashlight may be configured to emit white light. In another nonlimiting example, the light source 102 may be a light-emitting diode (LED). The LED may be configured to emit ultraviolet light (e.g., UV-A) with the wavelengths in the range of 340 nm to 400 nm).

The detector 104 is configured to receive an evaluation light 115 related to the emitted light 103. The evaluation light 115 may correspond to (i.e., may represent) a health status of a plant under test. As used herein, plant health status may include, but is not limited to, plant stress and/or plant disease. For example, if the emitted light 103 is white light, the evaluation light 115 may correspond to reflected and/or transmitted visible light. In another example, if the emitted light 103 is UV-A light, the evaluation light 115 may be intermediate light 107 (i.e., without detector polarizer 114). Continuing with this example, intermediate light 107 corresponds to visible light (i.e., fluorescence) emitted by the plant under test 106 in response to illumination by the emitted UV-A light 103.

In some embodiments, system 100 may include source polarizer 112 and detector polarizer 114. The source polarizer 112 may be positioned between the light source 102 and the plant under test 106. Source polarizer 112 may be coupled to light source 102 and is configured to filter emitted light 103 emitted from the light source 102 to yield polarized emitted light 113. The plant under test 106 may then be illuminated by the polarized emitted light 113. The detector polarizer 114 may be positioned between the plant under test 106 and the detector 104. Detector polarizer 114 may be coupled to detector 104 and is configured to filter intermediate light 107 received from the plant under test 106 to yield evaluation light 115. The detector 104 may then be configured to receive evaluation light 115. In one nonlimiting example, source polarizer 112 and detector polarizer 114 may be included in system 100, when the light source 102 is configured to emit white light. In another nonlimiting example, source polarizer 112 and detector polar 114 may not be present when the light source 102 is configured to emit ultraviolet light.

The location sensor 108 may be configured to receive location data 109. Location sensor 108 may then be configured to identify or determine location based, at least in part, on the location data 109. Location data 109 may include, but is not limited to, global positioning system (GPS) data, cellular telephone cell location data, wireless Internet hotspot location data, waypoint location (i.e., near field communication), derived location from, for example, an onboard accelerometer based, at least in part on, waypoint data, etc.

Computing device 110 includes processor circuitry 120, memory circuitry 122, input/output (I/O) circuitry 124 and a user interface (UI) 126. Computing device 110 may further include a plant status module 130. System 100 may further include network 140, cloud 142 and plant status data store 132.

Processor circuitry 120 may include, but is not limited to, a single core processing unit, a multicore processor, a graphics processing unit (GPU), a plurality of GPUs operating in parallel, a microcontroller, an application-specific integrated circuit (ASIC), a field programmable gate array (FPGA), a programmable logic device (PLD), etc. Processor circuitry 120 may be configured to perform operations of computing device 110, e.g., plant status module 130.

Memory circuitry 122 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively memory circuitry 122 may include other and/or later-developed types of computer-readable memory.

I/O circuitry 124 may be configured to couple computing device 110 to network 140 and/or cloud 142 wired and/or wirelessly. In one nonlimiting example, cloud 142 may be configured to provide shared computing resources to remote users, e.g., computing device 110, via network 140. However, this disclosure is not limited in this regard.

User interface (UI) 126 may include a user input device (e.g., keyboard, keypad, mouse, touchpad, touch sensitive display, a microphone, etc.) and a user output device (e.g., a display, a loudspeaker, a visual indicator (e.g., light bulb, light emitting diode (LED), etc.).

System 100 may further include a plant status data store 132. Plant status data store 132 may be configured to store a plurality of plant status records. Each record may include a location identifier, a plant status indicator for at least one plant located at or near the location associated with the location identifier and a timestamp. In some embodiments, plant status data store 132 may be included in computing device 110. In other embodiments, plant status data store 132 may be coupled to computing device 110. In some embodiments, plant status data store 132 may be coupled to the cloud 142 via network 140. Plant status data store 132 may correspond to or be included in a storage device, as described herein.

In an embodiment, system 100 may include a transport device 144. Transport device 144 may include, but is not limited to, a handheld computing device (e.g., a smartphone, a tablet computer, etc.), an autonomous vehicle (e.g., an unmanned aerial vehicle (i.e., drone), terrestrial robot, etc.). Transport device may thus be configured to carry the light source 102, detector 104, location sensor 108, computing device 110 and polarizers 112, 114 (if present) to a location at or near the plant under test 106.

In one nonlimiting example, transport device 144 may be a smartphone (or a tablet computer). However, this disclosure is not limited in this regard. The light source 102 may then be a flashlight (or LED) included in the smartphone 144 and the detector 104 may correspond to a camera included in the smartphone. Polarization of intermediate light from the plant under test may then be provided by a polarizing lens coupled to the camera, and/or image processing evaluation light data retrieved from the camera.

In another embodiment, system 100 may not include transport device 144. In one nonlimiting example, light source 102 may be a flashlight and detector 104 may be a human eye. However, this disclosure is not limited in this regard. Source polarizer 112 may be present and coupled to the flashlight 102 and detector polarizer 114 may correspond to or be included in polarizing eye wear worn by a user. The user may then contain detector 104 (e.g., human eye). The user may be configured to capture plant status data and to enter the plant status data into the plant status data store 132 using, for example, UI 126.

Plant status module 130 may be configured to manage status evaluation (i.e., early detection of plant disease (including plant stress)) operations for a plant under test, e.g., plant under test 106. The status evaluation may include one plant or a plurality of plants in a region or regions of plants. Operations associated with managing plant status evaluation may include, but are not limited to, controlling light source 102 and/or detector 104, capturing data from detector 104, location sensor 108 and/or UI 126, analyzing plant status data, associating plant status data with location data and timestamp and storing to plant status data store 132. Controlling light source 102 may include, but is not limited to, turning the light source on or off, adjusting polarization and/or wavelength of emitted light. Controlling detector 104 may include, but is not limited to, adjusting polarization and/or filtering of detected light. Analyzing plant status data may include, but is not limited to, image processing to identify contrasts indicative of plant disease and/or stress, machine learning configured to train plant status module 130 to identify plant disease or plant stress. Analyzing plant status data may further include monitoring a trend in plant status associated with a selected location and based, at least in part, on a time duration between a pair of plant statuses, sequential in time. Operations of the plant status module 130 may be performed by computing device 110 and/or cloud 142.

Thus, an apparatus, method and/or system for early detection of plant disease (including plant stress) may be configured to illuminate a plant under test using a light source and to detect a corresponding evaluation light from the plant under test using a detector. Characteristics of the evaluation light may then be indicative of plant disease and/or plant stress.

Figure 2:
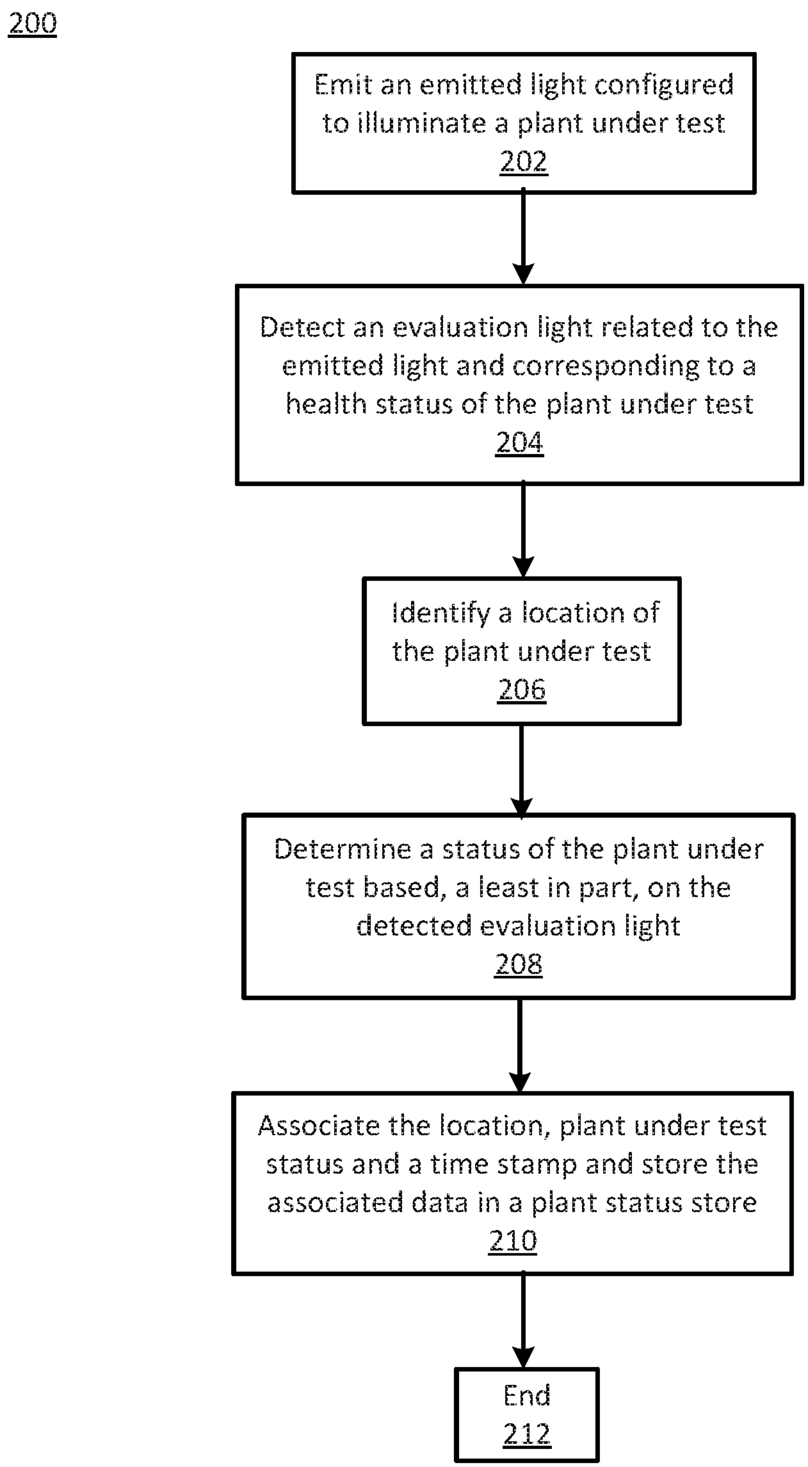
FIG. 2 is a flowchart of example early plant disease detection operations consistent with several embodiments of the present disclosure.

FIG. 2 is a flowchart 200 of example early plant disease detection operations consistent with several embodiments of the present disclosure. In particular, flowchart 200 illustrates illuminating a plant under test and detecting and analyzing an evaluation light. The operations of flowchart 200 may be performed by, for example, system 100 (including, e.g., light source 102, detector 104 and plant status module 130) of FIG. 1.

In some embodiments, operations of flowchart 200 may begin with emitting an emitted light configured to illuminate a plant under test at operation 202. Operation 204 may include detecting an evaluation light related to the emitted light and corresponding to a health status of the plant under test. Operation 206 may include identifying a location of the plant under test. Operation 208 may include determining a status of the plant under test based, a least in part, on the detected evaluation light. Operation 210 may include associating the location, plant under test status and a time stamp and storing the associated data in a plant status store. Program flow may then end at operation 212.

Thus, early plant disease may be detected and monitored.

EXAMPLES

The hardware/physical characteristics that enhance contrast for early disease detection include, but are not limited to, two modes of operation: UV-induced fluorescence and polarized reflectance/diffuse scattering of white light from plant leaves.

In one nonlimiting example, with system 100 configured for fluorescence mode, light source 102 may correspond to a UV-A LED centered at 365 nm. It may be appreciated that a UV-A LED centered at 365 nm is a relatively common commercially available component that can be cost effectively and safely incorporated into a practical system. The example UV-A LED had a maximum output optical power of 1.2 W. A band-pass blocking filter may be included, configured to further reduce "edges" of the spectral emission, a small percentage of which can be in the visible range (>400 nm). The blocking filter may be useful to reduce visible light, which reduces fluorescence image contrast. This example further included a focusing lens (such as on a flashlight that has enough transmission from 340-390 nm) to control the beam size on plant leaves. Under typical night time conditions with dim light (such as moonlight or distant street lights or sky glow, about 3 lux and less), fluorescence from a variety of plant leaves (such as basil, squash, cucumber, grape and others) can be seen by the naked eye using a total integrated intensity (from 340-390 nm) of <9.5 $W/m^2$, with a peak spectral irradiance <0.87 $W/m^2$*nm, centered at ~365 nm with a symmetric Gaussian shape (as a function of wavelength). This relatively lower intensity is about ⅓ less intensity integrated over the UV-A region (340-400 nm) than is present from direct sunlight on a sunny day near noon and is generally regarded as safe even for extended exposures to the skin. The focusing lens can be adjusted to concentrate the light up to a total radiometric intensity of ~2.5 $kW/m^2$ with a peak spectral irradiance at ~368 nm of 210 $W/m^2$*nm. This enables visual inspection of emitted fluorescence in dim to moderate office lighting and dim outdoor sunlight (vertical illuminance at eye level ~50-125 lux, horizontal illuminance with illuminance meter pointing upward ~350-450 lux). The light that is not absorbed and backscattered from a typical leaf arriving at the face of the observer in a typical use case (~3 ft distance) is relatively low (on order of 0.003% of incident light on the leaf) and is considered safe even under relatively high intensity. In a relatively dimmer light (~<10 lux), a highest intensity condition can be used to view plant leaf fluorescence from a relatively long distance (>20 feet). Under a highest intensity condition (~2.5 $kW/m^2$ in the direct beam at 3-7 ft) it is not advisable that the user looks directly into the beam or expose the direct beam onto the skin for extended periods more than a few seconds. Using protective gear and visualization through a display may minimize any risks for high exposure levels.

In another nonlimiting example, the system 100 is configured to be portable (i.e., capable of being carried by a human). A portable system may include a flashlight configured to emit UV-A light or white light that is polarized. The portable system further includes eyeglasses configured with orthogonal polarization to the incoming light to thus reject reflections from the leaf surface to better visualize the light absorption within the body of the leaf (below the cuticle and epidermal layers). This contrast may be increased by removing surface reflection. An option to this example is to use the display of the smartphone camera, with an orthogonally oriented polarizer (or optimal orientation relative to flashlight beam, or ambient light) in front of the camera, along with camera color gain and display contrast settings for detecting early signs of chlorosis (loss of chlorophyll, visibly evident as yellow spots on a green leaf). The smartphone can also be used to increase color contrast for fluorescence mode.

In another nonlimiting example, the system 100 may include a white LED based flashlight (light source) with a plastic polarizer (source polarizer) and to capture images (or view by eye) using another plastic polarizing film (detector polarizer). Thus, useful images and contrast may be achieved with relatively low cost components that are commonly available. Performance can be further improved using a brighter flashlight and polarizers with higher contrast ratio. Contrast may be further enhanced using a computer display to adjust brightness, contrast and color saturation to make chlorotic spots on the leaf even more apparent to the observer, demonstrating that viewing on the display of an electronic device with in-line image processing can enhance detection.

Thus, an apparatus, method and/or system for early detection of plant disease (including plant stress) is configured to illuminate a plant under test by a light source and to detect by a detector a corresponding evaluation light from the plant under test. The light emitted from the light source may be white light that may then be polarized or ultraviolet light. The evaluation light may include reflected, transmitted or emitted (e.g., fluorescent) light. The polarization is configured to enhance disease-specific contrast for detection by a detector The ultraviolet (e.g., UV-A) light having a wavelength in the range of 340 nanometers (nm) to 400 nm may cause the plant under test to fluoresce and emit light in a visible range, i.e., wavelengths in the 400 to 700 nm range. The resulting fluorescence may facilitate disease detection by enhancing a color difference between regions of a leaf of a plant that is stressed and/or diseased.

Early detection of plant stress and/or disease may facilitate early intervention thus preventing spread and/or reducing severity of a detected disease. Additionally or alternatively, monitoring plant status over time and mapping location of stressed and/or diseased plants may facilitate early identification of a trend that may then support early intervention.

As used in any embodiment herein, the term "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hardwired circuitry, programmable circuitry such as computer processors including one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a field-programmable gate array (FPGA), a programmable logic device (PLD), a complex programmable logic device (CPLD), a system on-chip (SoC), etc.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

What is claimed is:

1. A system for detecting a plant health status, the system comprising:

a light source positioned relative to the plant, the light source configured to emit an ultraviolet light, the ultraviolet (UV) light corresponding to UV-A and having a wavelength in a range of 340 nanometers (nm) to 400 nm;

a detector positioned relative to the plant, the detector configured to receive evaluation light, the evaluation light related to the emitted light and corresponding to a disease status of the plant; and a plant status module operatively coupled to the detector and configured to determine the plant disease status based, at least in part, on a presence of characteristics of the received evaluation light indicative of plant disease and to monitor a trend in plant status associated with a selected location and based, at least in part, on a time duration between a pair of plant statuses taken for a same group of plants, sequential in time, wherein a maximum dose of ultraviolet exposure to the plant is less than 10 $kJ/m^2$ per observation time.

2. The system of claim 1, further comprising a plant status data store configured to store a plurality of plant status records, each record comprising a location identifier, a plant status indicator for at least one plant at or near the location and a timestamp.

3. The system of claim 1, wherein the plant status module is further configured to map the trend in plant status associated with the selected location.

4. The system of claim 1, further comprising a light source filter, comprising a band-pass blocking filter configured to block emissions having greater than 400 nm wavelength.

5. The system according to claim 1, further comprising a location sensor configured to sense a location of the plant, the location sensor coupled to at least one of the light source or the detector.

6. The system according to claim 1, wherein the light source is selected from the group comprising a flashlight and a light emitting diode (LED), wherein the light source comprises a maximum output optical power of 1.2 W.

7. The system according to claim 1, wherein the detector is a camera included in a handheld computing device.

8. A method for detecting a plant health status, the method comprising:

emitting, by a light source positioned relative to the plant, an ultraviolet light, the ultraviolet (UV) light corresponding to UV-A and having a wavelength in a range of 340 nanometers (nm) to 400 nm with a maximum dose of ultraviolet exposure to the plant that is less than 10 $kJ/m^2$ during an observation time;

receiving, by a detector positioned relative to the plant, evaluation light, the evaluation light related to the emitted light and corresponding to a disease status of the plant;

determining, by a plant status module operatively coupled to the detector, the plant disease status based, at least in part, a presence of characteristics of the received evaluation light indicative of plant disease, monitoring, by the plant status module, a trend in plant status associated with a selected location and based, at least in part, on a time duration between a pair of plant statuses taken for a same group of plants, sequential in time.

9. The method of claim 8, further comprising storing, by a plant status data store, a plurality of plant status records, each record comprising a location identifier, a plant status indicator for at least one plant at or near the location and a timestamp.

10. The method of claim 8, further comprising mapping, by the plant status module, the trend in plant status associated with the selected location.

11. The method of claim 8, further comprising filtering the light emitted by the light source with a band-pass blocking filter configured to block emissions having greater than 400 nm wavelength.

12. The method of claim 8, further comprising sensing, by a location sensor, a location of the plant, the location sensor coupled to at least one of the light source or the detector.

13. A computer readable storage device having stored thereon instructions that when executed by one or more processors result in the following operations comprising the method according to claim 8.

14. The method of claim 8, further comprising applying a product to the plant based on the disease status, wherein the product includes a pesticide or fungicide.

* * * * *